United States Patent [19]
Hitch

[11] Patent Number: 6,099,230
[45] Date of Patent: Aug. 8, 2000

[54] AUTOMATED LABWARE STORAGE SYSTEM

[75] Inventor: Jonn R. Hitch, Indianapolis, Ind.

[73] Assignee: Beckman Coulter, Inc.

[21] Appl. No.: 09/034,438

[22] Filed: Mar. 4, 1998

[51] Int. Cl.$^7$ .................................................. B65G 1/12
[52] U.S. Cl. ........................ 414/331.02; 414/223.02; 414/331.03; 414/331.04; 414/331.05
[58] Field of Search ................ 414/222.02, 222.07, 414/223.01, 223.02, 268, 269, 270, 331.02, 331.03, 331.04, 331.05, 610, 806, 807; 198/347.3; 211/207, 208; 312/267, 268

[56] References Cited

U.S. PATENT DOCUMENTS

| | | | |
|---|---|---|---|
| Re. 26,770 | 1/1970 | Lemelson ........................ | 198/867.08 X |
| 3,754,632 | 8/1973 | Kreutter ................................ | 198/347.3 |
| 4,201,507 | 5/1980 | Hinchcliffe et al. .............. | 198/347.3 X |
| 4,220,236 | 9/1980 | Blidung et al. ....................... | 198/347.3 |
| 4,614,474 | 9/1986 | Sudo ........................................ | 414/281 |
| 4,639,187 | 1/1987 | Maruyama et al. ..................... | 414/787 |
| 4,838,749 | 6/1989 | Potocjnak .................................. | 414/277 |
| 5,059,079 | 10/1991 | Foulke et al. ............................ | 414/275 |
| 5,104,277 | 4/1992 | Bullock .................................... | 414/280 |
| 5,113,992 | 5/1992 | Sadamori .............................. | 198/347.3 |
| 5,149,240 | 9/1992 | Di Rosa ................................... | 414/277 |
| 5,149,654 | 9/1992 | Gross et al. .............................. | 435/287 |
| 5,203,661 | 4/1993 | Tanita et al. ............................. | 414/331 |
| 5,220,548 | 6/1993 | Nakatsukasa et al. .................... | 369/36 |
| 5,328,316 | 7/1994 | Hoffmann ................................. | 414/280 |
| 5,498,116 | 3/1996 | Woodruff et al. ................... | 414/331.05 |
| 5,544,996 | 8/1996 | Castaldi et al. .......................... | 414/280 |
| 5,599,154 | 2/1997 | Hölscher et al. ........................ | 414/278 |
| 5,612,934 | 3/1997 | Dang et al. ................................ | 369/66 |
| 5,622,470 | 4/1997 | Schaefer et al. ............... | 414/331.05 X |
| 5,666,337 | 9/1997 | Dang et al. ................................ | 369/36 |

FOREIGN PATENT DOCUMENTS

| | | | |
|---|---|---|---|
| 1003972 | 3/1983 | U.S.S.R. ............................. | 198/347.3 |
| 2061216 | 5/1981 | United Kingdom ................ | 198/347.3 |

OTHER PUBLICATIONS

Microplate Standardization—Report #3; Aug. 11, 1996.

*Primary Examiner*—James W. Keenan
*Attorney, Agent, or Firm*—William H. May; Margaret A. Kivinski; Ice Miller Donadio & Ryan

[57] ABSTRACT

An apparatus for storing and retrieving labware comprises at least one labware hotel having a frame, a plurality of support arms for receiving and supporting labware, and an elevator capable of moving the support arms in unison. The support arms are periodically located upon an elevator cable and are removable from the cable such that the distance between adjacent support arms may be varied. A labware shuttle having a labware receiving surface is capable of holding and transporting labware between a first and second position. The first position is directly below a labware hotel and the second position is a location remote from the labware hotel. When the shuttle is in the first position, support arms from the labware hotel may engage labware held on the shuttle to remove labware from the shuttle or place labware upon the shuttle. When the shuttle is in the second position, the labware receiving surface may be rotated so that the labware upon the shuttle may be presented in at least two angular orientations.

26 Claims, 11 Drawing Sheets

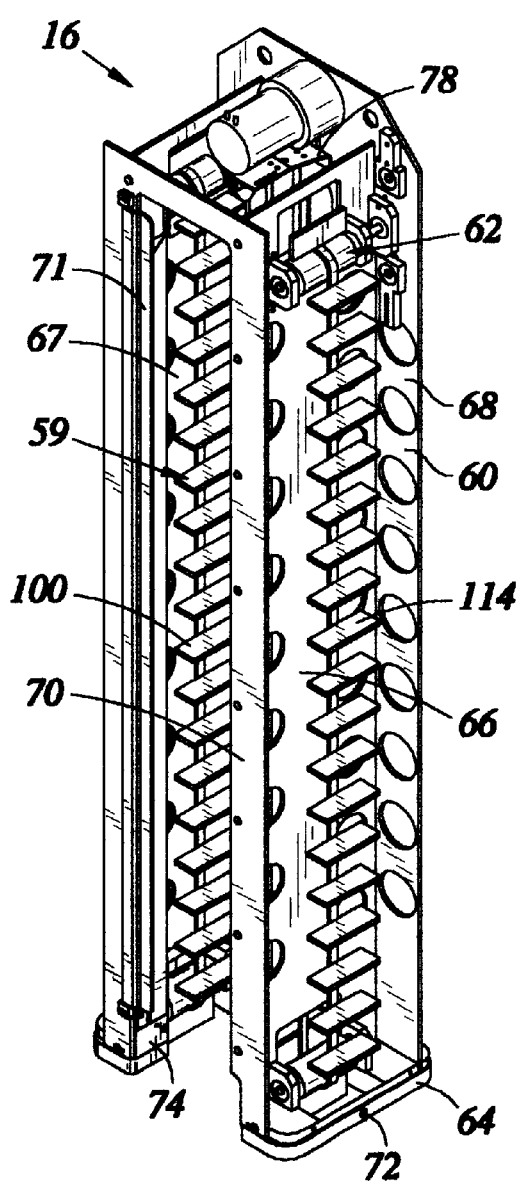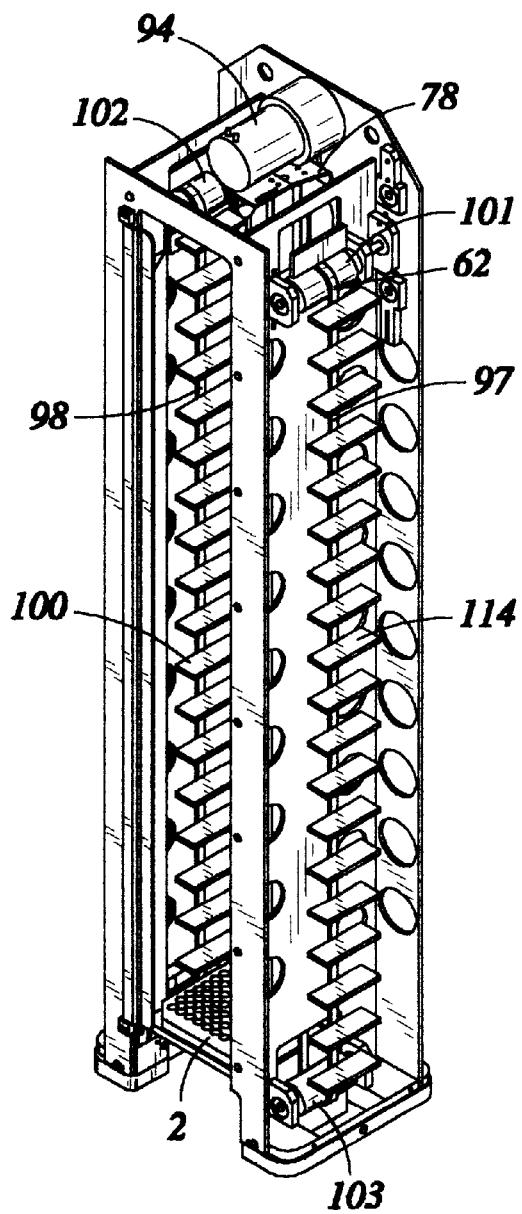

AUTOMATED LABWARE STORAGE SYSTEM

BACKGROUND OF THE INVENTION

The invention relates to systems for storing and dispensing labware for an automated laboratory.

"Labware" refers to items used in laboratory environments that can be moved to or from equipment automatically, such as microplates, filterplates, pippette tips, etc. While such labware normally conforms to certain footprint size specifications, there is no uniform or precise form factor for different labware. For example, some labware contain detents and notches so that they can be stacked on top of one another without slipping. Other labware contain ridges and notches on the side designed for engaging a robot, stacker or escapement mechanism of a particular manufacturer.

Due to the lack of a uniform form factor for labware, it is difficult to provide a robotic laboratory system that is able to move labware from different manufacturers. For example, some stackers may be used only with labware from a specific manufacturer.

It is also known to provide a central robot which is partially surrounded by multiple labware hotels, each of which contain shelves into which labware may be inserted or retrieved. While such a system may have the benefit of allowing labware of different sizes and sources to be inserted into the shelves of different hotels, the robot for such a system generally must have three-dimensional motion control, which is costly to implement, both in terms of hardware and control systems software. Moreover, such 3-D robot systems require some mechanism for keeping track of the specific type of labware that is housed in each hotel.

SUMMARY OF THE INVENTION

The invention in one embodiment comprises a labware hotel which is removably detachable from a base unit and which includes individual support means for each piece of labware stored by the hotel. In this manner, no piece of labware is stacked on (i.e., contacted directly by) an adjacent piece of labware. The support structure comprises opposing support arms for holding labware. The individual support arms are mounted to a central elevator system operable to move the support arms and labware within the hotel in unison. The support structure (arms) are relocatable with respect to each other on the elevator system, so the distance between adjacent sets of arms may be adjusted. For example, one hotel may be configured to store 20 pieces of labware that are each one inch high, while another hotel may be configured to store 10 pieces of labware that are each two inches high.

In the preferred embodiment, each hotel can be fitted into a carousel base which can rotate the hotels in unison so that a particular hotel can be positioned above a shuttle mechanism. The shuttle operates to: (a) insert a labware into the bottom stack of a hotel; and (b) remove the bottom labware from the hotel and move it to a staging area where the labware may be grasped by a robotic unit. Optionally, the shuttle includes a rotating base so that the labware may be presented to the robot, either in the same orientation in which it is stored in the hotel, or rotate it to any desired position.

Each hotel may be configured with a first electrical connector to engage a second electrical connector on the carousel. The first electrical connector comprises a series of pins while the second electrical connector comprises a series of corresponding sockets for engagement with the pins. The electrical connectors serve two purposes. First, they provide electrical connection to drive a motor within the hotel that operates the elevator system. Second, the connectors serve to identify the configuration of the hotel. This can be done in one embodiment, by utilizing three pins of the first connector as either tied to ground or floating, thus providing for $2^3$ or 8 hotel configurations. For example, these configurations could represent eight different height configurations within the hotel.

BRIEF DESCRIPTION OF THE DRAWINGS

FIG. 5 shows a perspective view of a labware hotel (without an exterior casing) in accordance with the present invention;

FIG. 8 shows the labware hotel of FIG. 5 holding labware in a shelf;

DETAILED DESCRIPTION OF THE INVENTION

Figure 1:
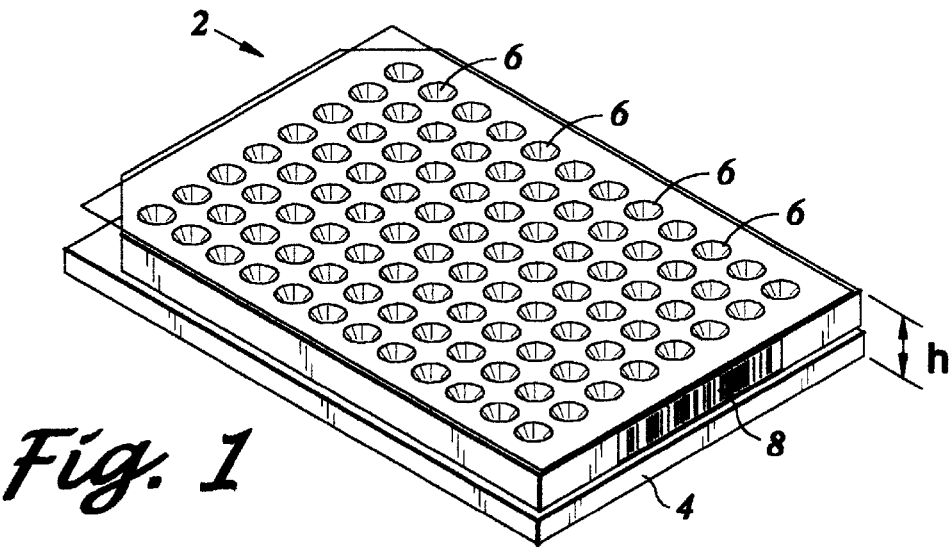
FIG. 1 shows a typical labware item which may be used in connection with the present invention.

FIG. 1 shows a perspective view of an exemplary piece of labware 2 which may be used in connection with the present invention. The labware is defined by a rectangular base 4 having a size as is standard in the industry and a unique footprint formed in the base by notches, detents, ridges or other surface designs and/or functional impressions. The labware also has a height which is not standard in the industry. One or more receptacles 6 is included in the labware for holding laboratory samples for testing. A barcode 8 is often included on the labware, allowing a bar-code reader to identify each particular labware. An example of such labware is a ninety-six well microplate generally known to those of ordinary skill in the art, wherein the ninety-six well microplate comprises ninety-six receptacles. However, the term labware as used herein may refer to and is used interchangeably with any number of items used in laboratory environments, including, but not limited to, microplates, filterplates, tip boxes, and pippette tips.

Figure 2:
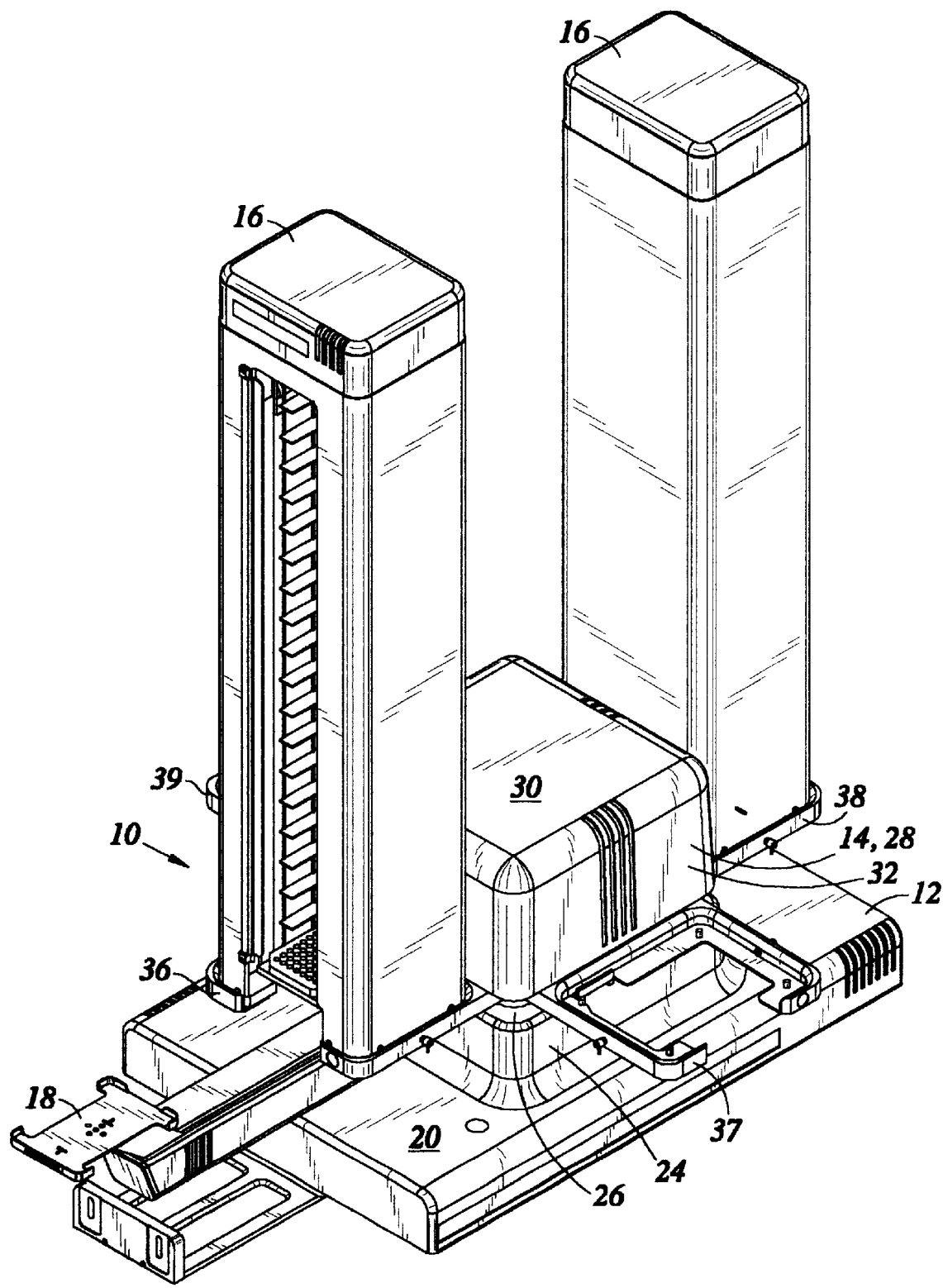
FIG. 2 shows a perspective view of an exemplary automated labware storage apparatus.
Figure 3:
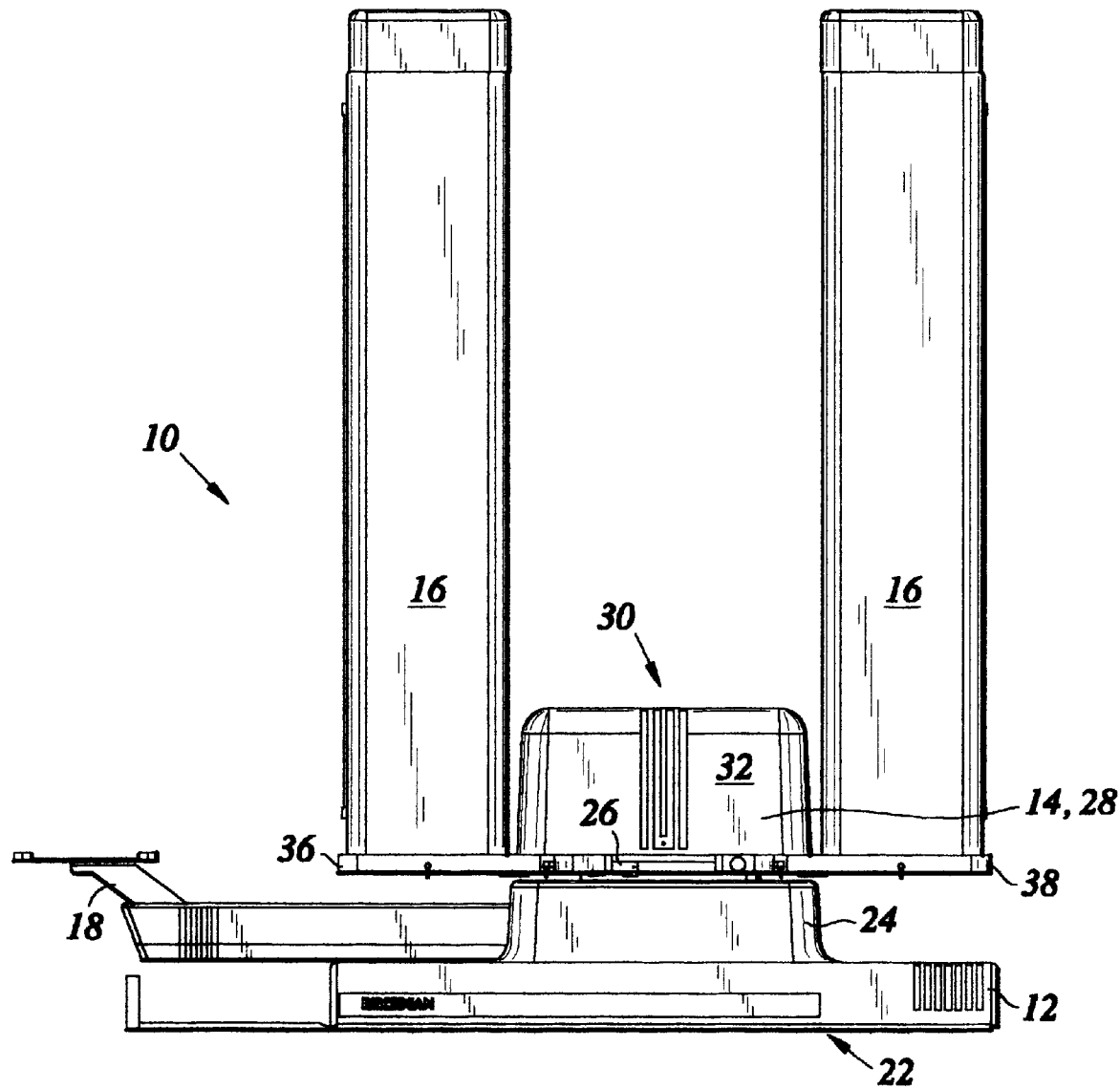
FIG. 3 shows a side view of the automated labware storage apparatus of FIG. 2.

The basic structure of an exemplary automated labware storage apparatus 10 is discussed in connection with FIGS. 2 and 3, which profile different views of the same apparatus. FIG. 2 shows a perspective view of the exemplary labware storage apparatus 10 and FIG. 3 shows a side view of the same apparatus.

In general, the labware storage apparatus 10 according to the present invention comprises a base 12, a mounting system 14 located upon the base, a plurality of microplate hotels 16 supported by the mounting system, and a microplate transporter 18.

The base 12 in the exemplary embodiment is rectangular in shape having a bottom surface 20 and a top surface 22. The bottom surface 20 may be situated upon a planar surface such as a lab table to provide a foundation for the labware storage apparatus. The top surface 22 of the base 12 supports the mounting system. The exact dimensions of the base 12 are a matter of mechanical design choice and do not warrant further discussion herein.

The mounting system 14 is secured to a central location upon the base 12. The mounting system 14 comprises a stationary platform 24 fixed to the base 12 and a rotatable carousel 26 situated upon the stationary platform. A stepper motor 25 (see FIG. 15) is capable of imparting rotary motion to the carousel 26 such that the carousel may be rotated 360° with respect to the stationary platform 24. The carousel 26 includes a rectangular case 28 having four sidewalls 32 and a top 30. The carousel 26 further includes a plurality of hotel supports including a first, second, third and fourth C-shaped hotel support 36–39, such that one hotel support projects from beneath each sidewall of the carousel case 28.

Figure 4:
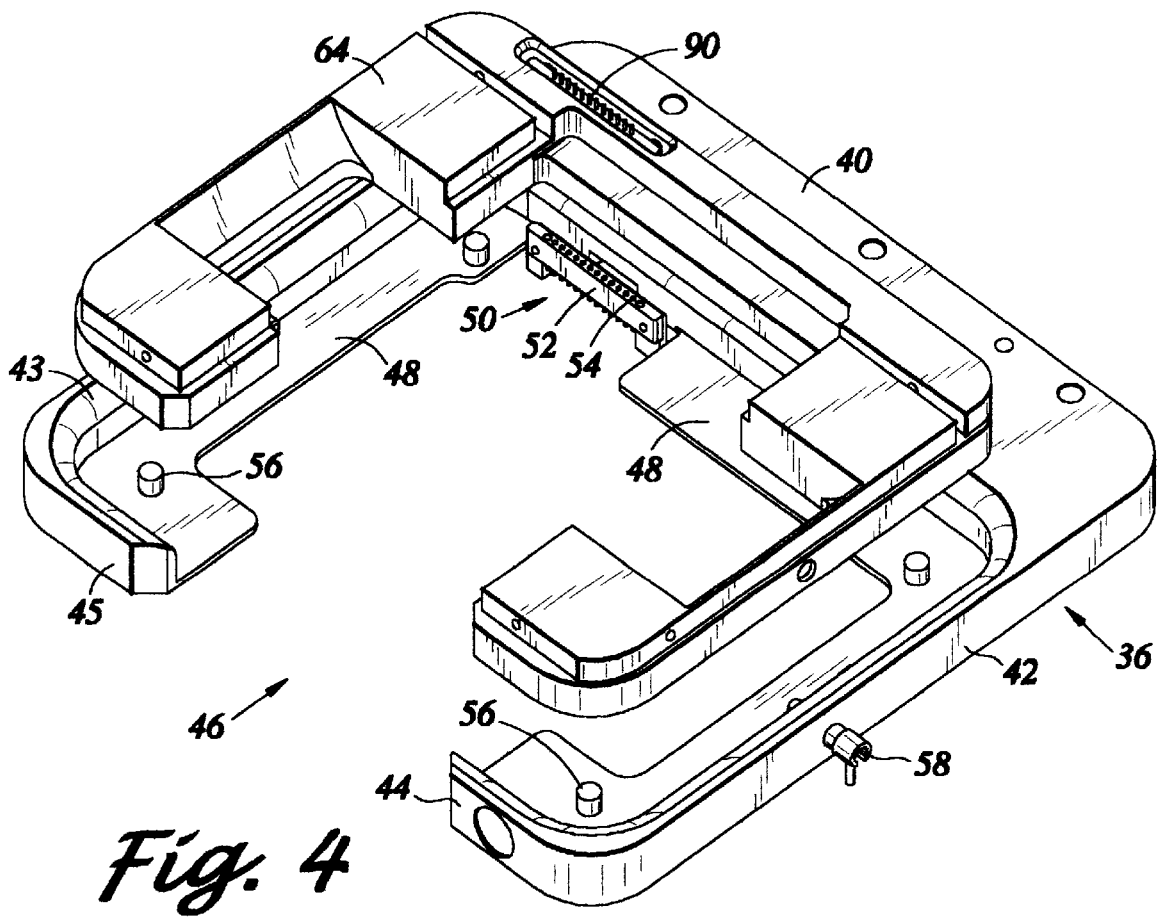
FIG. 4 shows a perspective view of the hotel support and hotel base of FIG. 2.

The hotel supports 36–39 are designed for receiving microplate hotels and securing them to the carousel. As shown in FIG. 4, each hotel support 36 comprises a rear mounting bracket 40 with two jaws 42–43, one jaw extending from each end of the bracket. At one end of each jaw, removed from the mounting bracket 40, a lip 44 extends from the jaw toward the opposing jaw 43. The lips 44–45 of the side arms define a shuttle door 46 for receiving the microplate transporter 18. A support ledge 48 is included around an inner boundary of the hotel support 36. A recess 50 is provided in the support ledge 48 to position a second electrical connector 52 comprising a plurality of sockets 54 against the rear mounting bracket 40. Hotel base guides 56 are provided upon the support ledge 48 for cooperating with the microplate hotel 16 to position and add stability to the microplate hotel within the hotel support 36. A lockdown pin 58 is located on one jaw 42 of the hotel support 36 for engagement with the microplate hotel 16 to further secure the hotel to the hotel support.

Figure 6:
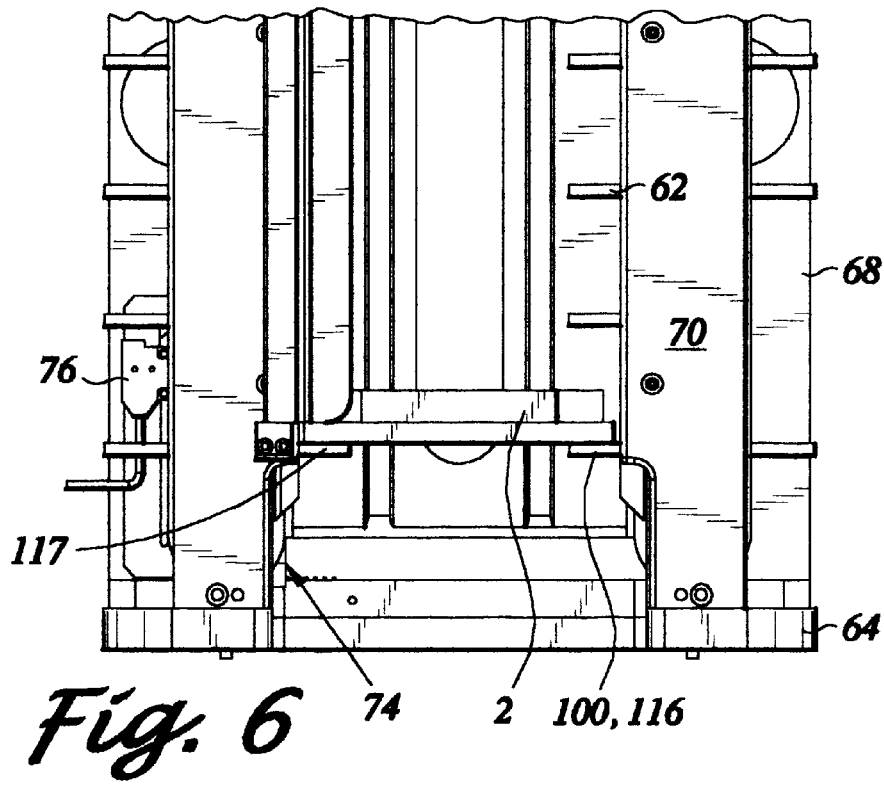
FIG. 6 shows an enlarged bottom front view of the labware hotel of FIG. 5.

As show in FIGS. 5–6, each microplate hotel 16 comprises a frame 60 defining a labware storage area 59 and supporting an elevator system 62. The frame 60 is preferably comprised of a sturdy metal material such as steel, and provides the rectangular block shape of the microplate hotel. The frame 60 includes a base portion 64 adjoined to the bottom of two side beams 66–67, a back wall 68 and an open face plate 70. A lockdown chamber 72 is formed in the base portion 64 for receiving the lockdown pin 58 of the hotel support jaw 42. The two side beams 66–67, the back wall 68 and the open face plate 70 each extend vertically from the base portion 64. A hinged door comprising a hinge 71 and a door (not shown) may also be provided across the open face plate 70 to prevent labware from falling out of the hotel. A labware sensor 74 is positioned near the bottom of one of the side beams 66 for determining whether labware is present on the transporter 18. The labware sensor 74 is a solid state optical sensor that uses infrared light to detect the presence of labware. The labware sensor is electrically connected to a pin of a first electrical connector 90 (see FIG. 7) on the microplate hotel. Furthermore, an arm index sensor 76 is positioned upon the back wall 68 for sensing when a shelf 100 has moved one level. The arm index sensor 76 is also a solid state infrared optical sensor electrically connected to a pin of the first electrical connector 90. A sensor support flange 78 extends horizontally from the back wall 68 near the top of the side beams 66–67 and face plate 70. An upper limit sensor 80 is fixed to the bottom of the sensor support flange 78 to sense when the microplate hotel 16 is full with labware. The upper limit sensor 80 is a solid state infrared optical sensor with a limited range that only detects the presence of labware with in the limited range. The upper limit sensor is electrically connected to a pin of a first electrical connector 90.

Figure 7:
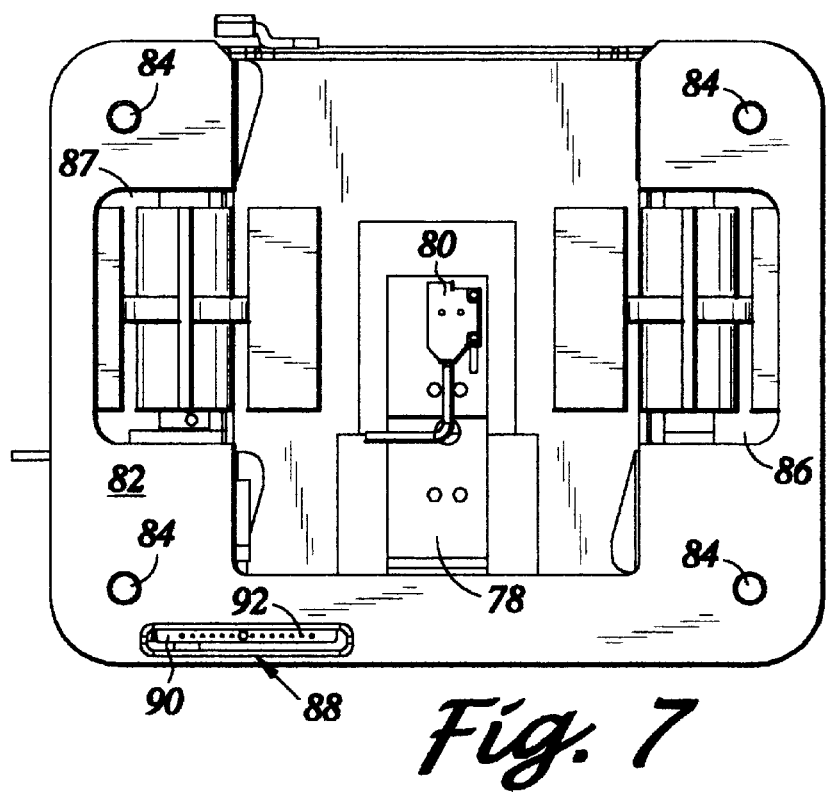
FIG. 7 shows a bottom view of the labware hotel of FIG. 5.

FIG. 7 shows the microplate hotel 16 as viewed from the bottom of the microplate hotel. The upper limit sensor 80 is shown from this view fixed to the bottom of the sensor support flange 78. The base portion 64 includes a C-shaped bot tom plate 82 and four guide holes 84. The bottom plate 82 may be positioned upon the support ledge 48 to mount the microplate hotel 16 to the carousel 26. Correct placement of the bottom plate 82 upon the hotel support 36 will cause the four base guides 56 to engage the four guide holes 84. Two elevator cavities 86–87 are formed in the bottom plate 82 to provide clearance for operation of the elevator system 62. A recess 88 is also formed in the bottom plate for receiving the first electrical connector 90 having a plurality of pins 92. The pins 92 of the first electrical connector 90 engage corresponding sockets 54 on the second electrical connector 52. Engagement of the first 90 and second electrical connectors 52 provides a means for transmitting electrical power to or retrieving electrical information from the microplate hotel 16. Hotel power may be required for any number of microplate operations including, but not limited to, drive systems within the hotel and hotel sensors. Electrical information may be required from the microplate hotel 16 to provide hotel configuration or registration information to a control system 200 responsible for coordinating operation of the hotel 16. In the preferred embodiment, at least three pins 92 of the first electrical connector 90 are used to provide hotel registration information. These three pins may be tied to ground or to a voltage source, thus providing $2^3$ or 8 possible hotel configurations. These configurations could represent, for example, eight different storage height/labware type configurations for labware within the hotel 16. One configuration could be for 0.75" ninety-six well microplates, while another configuration could be for 0.5" ninety-six well microplates. An additional configuration could be for 1.5" filter plates, while still another configuration could be for 2" tip boxes. The hotel configuration communicated to the controller via the first and second electrical connectors allow the controller to determine various operations of the automated labware storage apparatus, such as how much time should be required for the elevator system 62 to move the shelves 100 one level.

Figure 9:
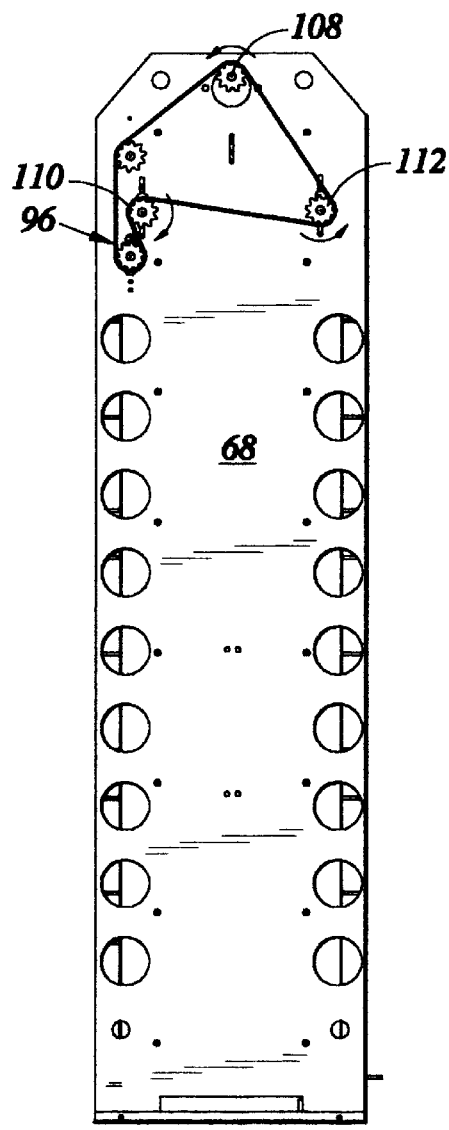
FIG. 9 shows a drive train as viewed from the rear of the labware hotel of FIG. 5.
Figure 10:
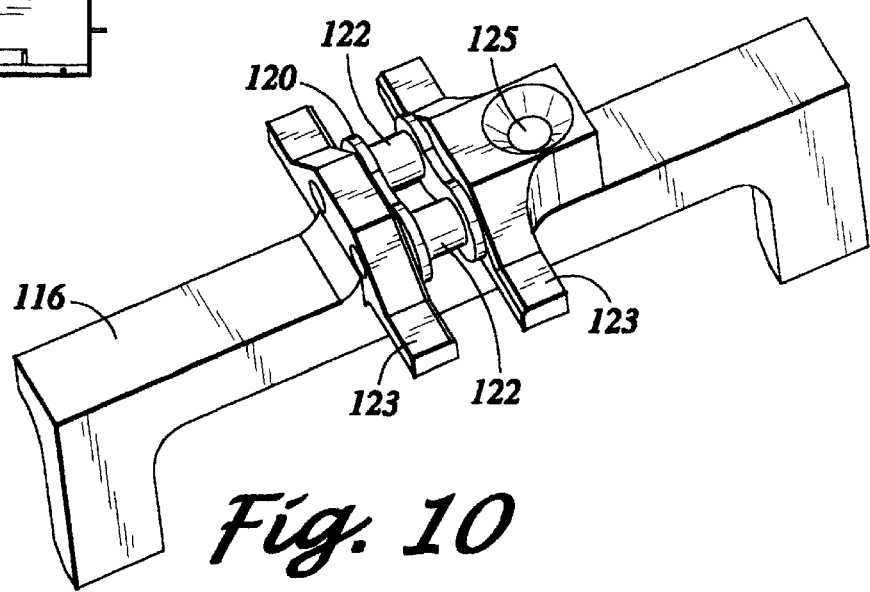
FIG. 10 shows a perspective view of a support arm of the labware hotel of FIG. 5.
Figure 11:
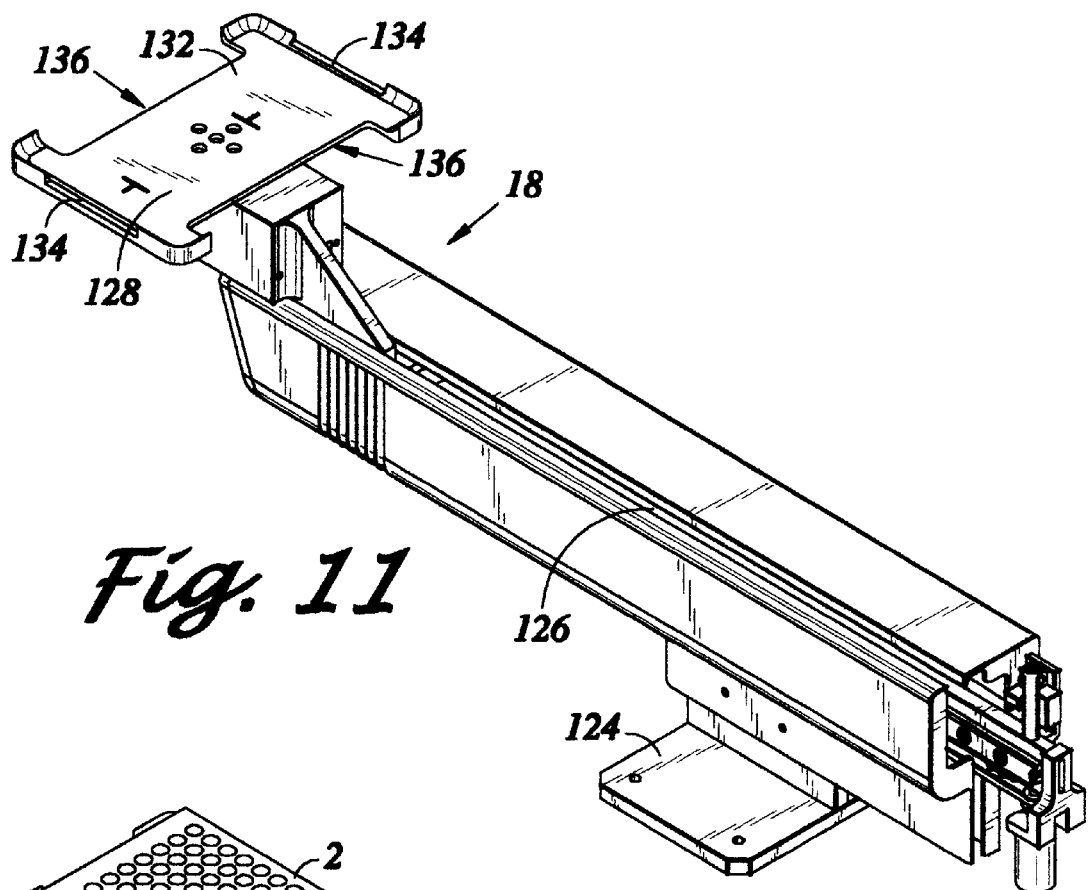
FIG. 11 shows a perspective view of the transporter of FIG. 2.
Figure 14:
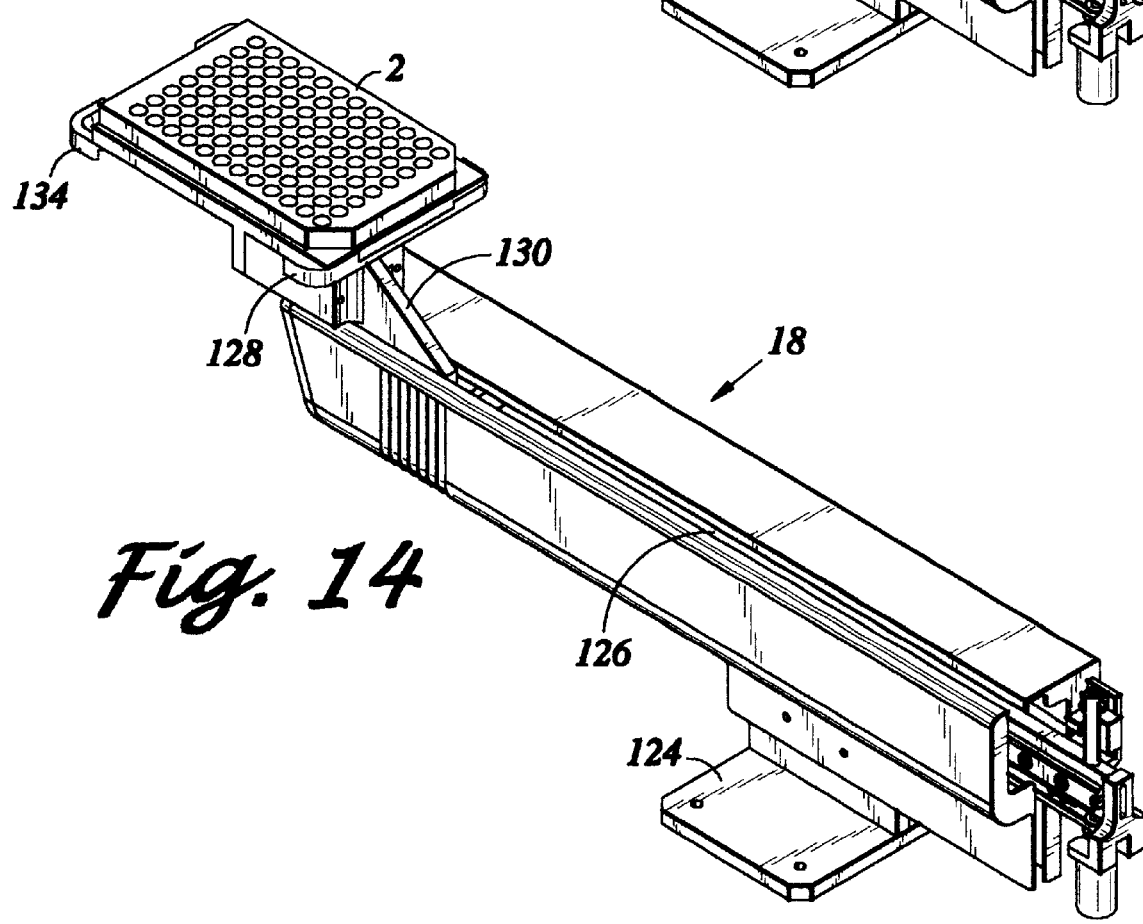
FIG. 14 shows a perspective view of the transporter of FIG. 11 holding labware.
Figure 12:
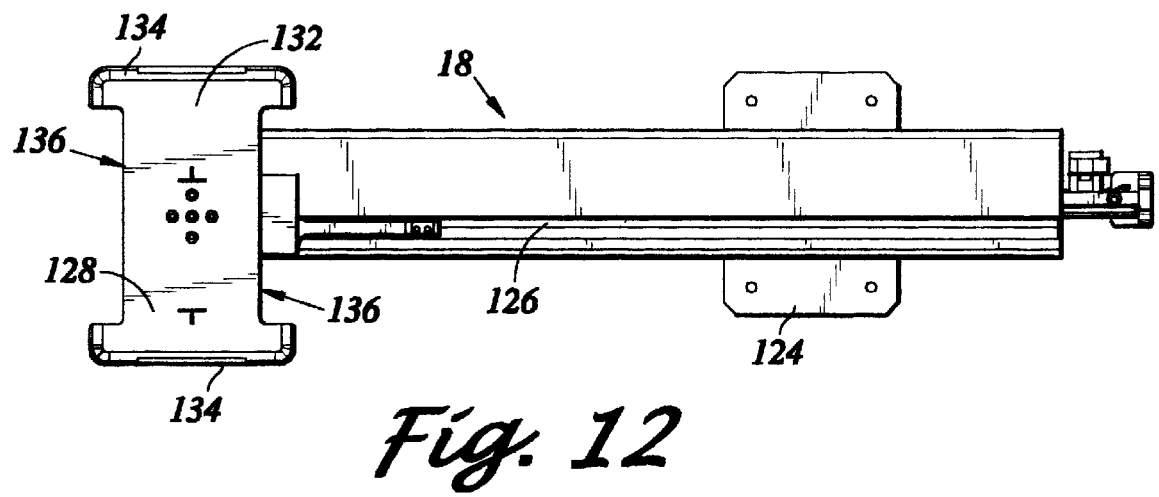
FIG. 12 shows a top view of the transporter of FIG. 11.
Figure 13:
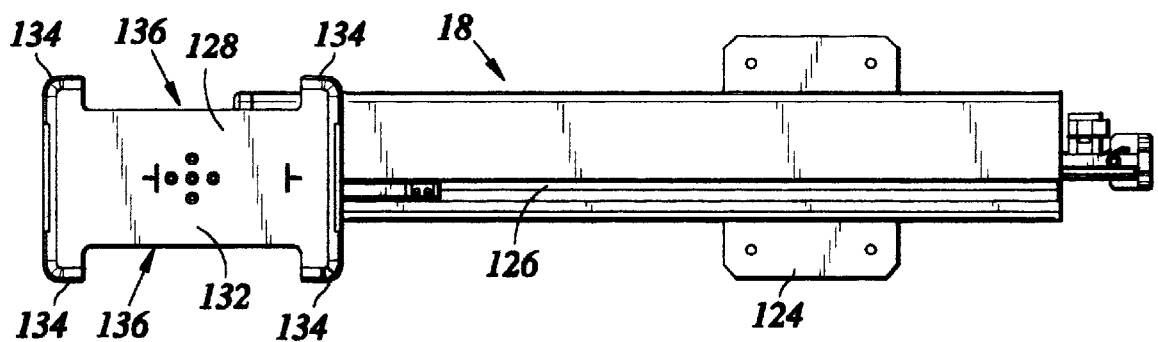
FIG. 13 shows a top view of an alternative embodiment of the transporter of FIG. 11.

FIGS. 8–10 display the elevator system 62 which includes an elevator motor 94, a drive train 96, a first and a second elevator cable 97–98 and four sprockets 101–104. The elevator motor 94 is positioned on the back wall 68 above the sensor support flange 78 and includes a drive shaft that is connected to a drive gear 108 of the drive train 96. As shown in FIG. 9, rotation of the drive gear 108 provides rotation to a first and a second driven gear 110–112 such that the first and second driven gears rotate in opposite directions within the drive train 96. Rotation of the first and the second driven gears 110–112 imparts rotation to a first and a second top sprocket 101–102. The first elevator cable 97 encircles the first top sprocket 101 and a first bottom sprocket 103 within the elevator system. Likewise, the second elevator cable 98 encircles the second top sprocket 102 and a second bottom sprocket 104. The opposite direction of drive gear rotation causes the elevator cables 97–98 to rotate in symmetry with each other and provides for unified shelf 100 movement within the labware hotel 16.

A plurality of support surfaces 114 are positioned on the elevator cables 97–98 for receiving and supporting labware. The plurality of support surfaces may comprise a plurality of support arms 116 periodically positioned upon each elevator cable 97 such that the support arms extend away from a loop formed by the cable encircling the top 102 and bottom sprocket 104. In one embodiment, each support arm 116 has a corresponding opposing support arm 117 (see FIG. 6) located on the opposite elevator cable 98 as a result of symmetric positioning of the support arms upon the cables. Therefore, a support arm 116 positioned between the two elevator cables 97–98 will have a corresponding support arm 117 also positioned between the two cables. A shelf 100 is formed by two support arms positioned between the elevator cables. Shelves 100 formed by support arms 116 positioned between the elevator cables 97–98 are capable of receiving and carrying labware within the microplate hotel 16. Shelves 100 are also capable of dispensing labware from the hotel 16. The vertical distance between shelves defines a storage height capable of receiving labware with a height up to the storage height.

The support arms 116 are adjustably positioned upon the elevator cables 97–98 such that the distance between the shelves 100, i.e., the storage height, may be varied. In one embodiment shown in FIG. 10, the elevator cables 97–98 are chains having a plurality of lengths 120 with roller pins 122. The support arms 116 comprise clamps 123 and a bore 125 for receiving a screw. Tightening of the screw in the bore causes the clamps to grip the roller pins 122 of the chain lengths 120, thus anchoring the support arm to the chain length. The support arms 116 may be removed and repositioned upon the cable 97 by loosening the screws and placing the support arms upon different chain lengths 120. By providing for support arms 116 which may be adjusted upon the cables 97–98, the distance between the shelves 100 may be varied and the shelves may configured to receive labware of various heights.

As shown in FIGS. 11–14, a transporter 18 is capable of receiving labware from or providing labware to the shelves 100 of the elevator system 62. The transporter 18 comprises a transporter mounting plate 124, a track 126 and a shuttle 128. The transporter mounting plate 124 is rectangular in shape with a planar surface that may be mounted to the base 12 of the labware storage apparatus 10. The track 126 is fixed to the transporter mounting plate 124 and projects from a first shuttle position beneath one of the microplate hotels 16 to a second position remote from the base 12 and microplate hotels 16 of the labware storage apparatus 10.

Figure 15:
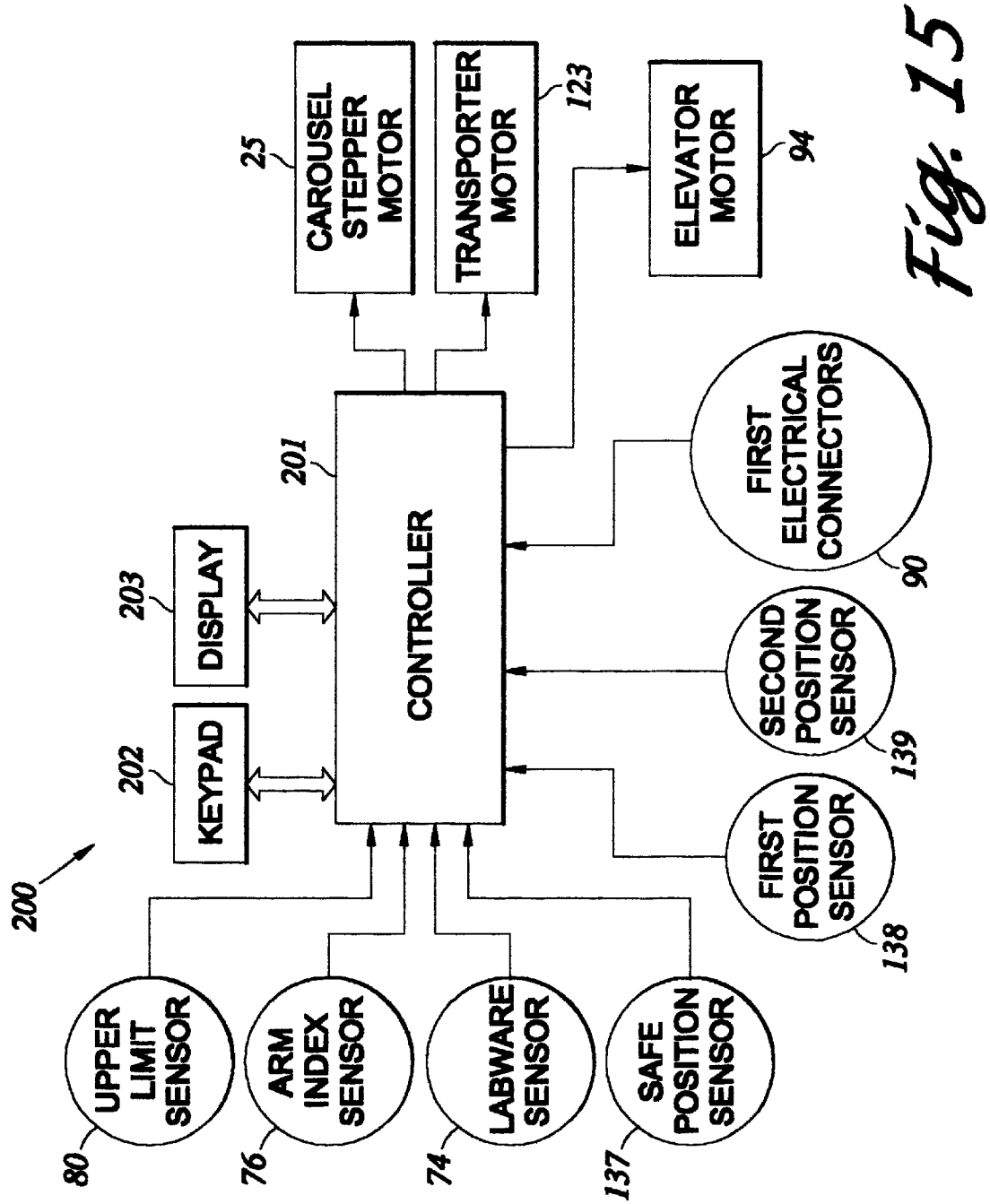
FIG. 15 shows a controller circuit for use in connection with the automated labware storage apparatus of the present invention.

The shuttle 128 engages the track 126 and is linearly movable along the track between the first and second positions by the operation of a transporter motor 123 (see FIG. 15). Sensors 137–139 are positioned along the track to indicate when the shuttle 128 is in the first or second position, or in a "safe" position halfway between the first and second positions. The sensors are "through beam" infrared sensors that detect a break in a beam of infrared light. A tab positioned upon the shuttle causes a break in the infrared light when the shuttle reaches the first, safe or second positions. An electrical signal is sent from the signal to the controller to indicate that the shuttle has reached a particular position.

The shuttle 128 comprises a runner 130, a labware receiving surface 132, and rails 134. The shuttle runner 130 engages the track 126, and the labware receiving surface 132 is positioned above the runner 130 for holding labware. The rails 134 are formed at ends of the receiving surface 132 for containing labware held by the labware receiving surface 132. Support arm indentations 136 are provided upon the labware receiving surface 132 between the rails 134 to prevent the support arms 116 from contacting the labware receiving surface. The labware receiving surface 132 does not completely cover a bottom of labware positioned upon the shuttle because the support arm indentations 136 expose the bottom portion of the labware. As displayed in FIGS. 12 and 13, the labware receiving surface 132 is rotatable with respect to the track 126. Rotation of the labware receiving surface 132 allows labware positioned upon the receiving surface to present the labware in multiple angular orientations.

FIG. 15 shows a block diagram of a controller circuit 200 operable to control the automatic operation of the automated labware storage apparatus of FIG. 2. The controller circuit includes an controller 201 that is operably connected to each of the elevator motors 94, hotel sensors 74, 76, 80, transporter sensors 137–139, a keypad 202, a display device 203, the carousel stepper motor 25 and the transporter motor 123. The controller comprises an instruction register, a memory location which holds software commands for the controller, and a data bus for transferring software commands between the memory location and the instruction register. The controller reads the software commands and transmits electrical signals to the display device, the carousel motor, the transporter motor, or the elevator motors to execute the software commands. An example of such a controller is the Z180 embedded microprocessor produced by Zilog, Inc. of Campbell, Calif.

In general, the controller executes program steps to control the operation of the automated labware storage apparatus 10 of FIGS. 2 and 3 in the manner described below. To this end, the controller 201 generally receives electrical signals from the upper limit sensors 80, index arm sensors 76, labware sensors 74, and hotel registration information from the first electrical connectors 90 found on each microplate hotel. Upon receiving electrical signals from the hotel, the controller must process the information contained in the electrical signals and use the information in accordance with commands requested by an operator from the keypad or preprogrammed within the controller. For example, the controller must be capable of recognizing when the hotel registration information provides for a particular storage height within the hotel and the controller must be prepared to operate the elevator motor to move the shelves based upon this storage height. In addition to receiving signals from each hotel, the controller also receives electrical signals from the safe position sensor 137, first position sensor 138 and second position sensor 139 of the transporter. Furthermore, the controller 201 provides control signals to the carousel motor 25, the transporter motor 123, and each of the hotel elevator motors 94.

The controller 201 circuit also preferably includes a keypad 202 and a display 203. The keypad 202 is operably connected to the controller 201 and provides a means by which an operator can control certain parameters of the automated labware storage apparatus 10. The display 203 is operably connected to the controller 201 and provides a means by which error messages or other status information may be provided to an operator. The display 203 and keypad 202 may be, for example a personal computer with a full keyboard and monitor, or a handheld operator interface device with command touchpads and an LED screen display. In one embodiment, the system includes a switch to allow control by either a handheld pendant or an automated controller, such as a personal computer connected to the controller via an RS-232 serial port, both of which are familiar to those of skill in the art.

The operation of automated labware storage apparatus is described below with reference generally to all Figures and particularly to FIGS. 2 and 3. As many as four hotels 16 may be mounted in the hotel supports 36–39 of the automated labware storage apparatus 10. Each labware hotel 16 is mounted in a hotel support by engaging the four base guides 56 with the four guide holes 84 and causing the first electrical connector 90 of the labware hotel to mate with the second electrical connector 52 of the hotel support. Connection of the first and second electrical connectors provides electrical hotel registration information to the controller 201 as well as providing power to the hotel. The hotel lockdown pin 58 is inserted into the lockdown chamber 72 to assist in securing the hotel 16 to the hotel support 36. Once the labware hotels 16 are mounted in the hotel supports 36–39, labware 2 may be placed into or removed from the respective hotels. Each hotel may be configured to hold a different type of labware and a limited number of labware units depending upon the type of labware. When the hotels are mounted in the hotel supports, registration information about each hotel is communicated to the controller through the electrical connectors. Some labware hotels may be empty when mounted upon the hotel supports, while others may be full, depending upon the desired operation of the automated labware storage apparatus 10. Once the hotels are mounted on the hotel supports, those hotels with room for labware units may be loaded by an operator opening the hinged door and placing individual labware onto the shelves 100 of the hotel through the open plate 70. The hinged door is then closed to retain the labware on the shelves. Labware 2 may also be loaded into the labware hotel 16 by an automatic load operation described below. Alternatively, if labware is to be removed from the hotel, the operator may manually remove labware units by opening the hinged door and removing units or by an automatic unload operation described below.

In operation, the carousel 26 is rotated to place one of the labware hotels 16 directly above the first position of the transporter shuttle 128. Next, the transporter shuttle 128 is moved into the first position. With the labware hotel 16 and transporter 18 in this position, the labware hotel may unload a piece of labware 2 from the bottom shelf of the hotel 16 onto the transporter shuttle 18 or load a piece of labware from the transporter shuttle to the bottom shelf of the labware hotel.

Figure 16:
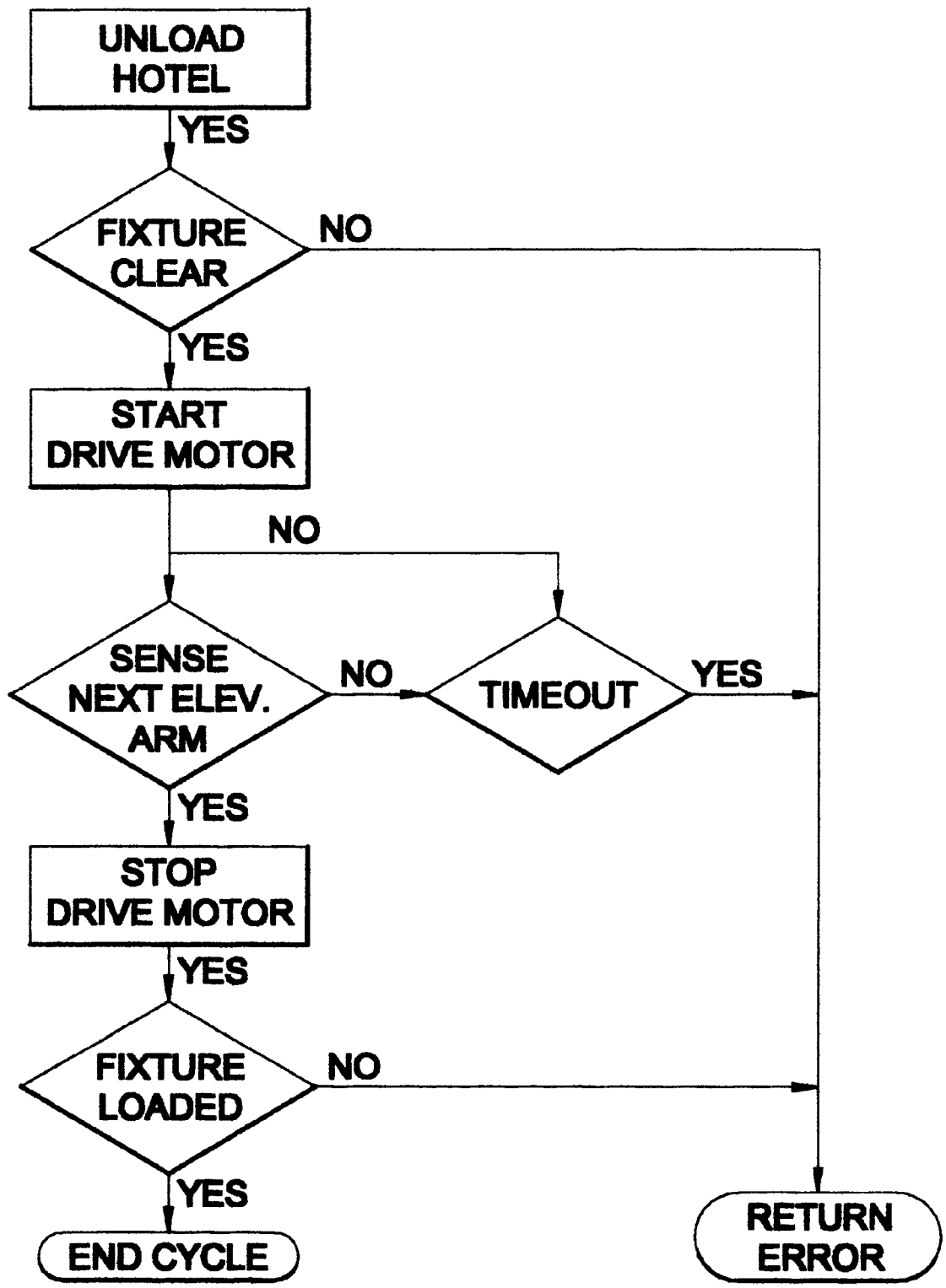
FIG. 16 shows a block diagram of the controller operation for dispensing labware from the labware hotel of the present invention.

As shown in FIG. 16, upon instructions from the operator to unload, the controller 201 polls the labware sensor 74 to determine if labware 2 is present on the shuttle 128. If labware 2 is present on the shuttle 128, an error message is returned to the display 203, and the labware hotel 16 will not be allowed to unload labware. If labware is not present on the shuttle 128, the controller will cause the support surfaces to cooperate with the transporter to place labware upon the transporter. To accomplish this, the controller 201 first causes the elevator system 62 to lower the shelves 100 in unison. As the elevator moves the shelves 100 and labware 2 toward the shuttle 128, the labware contacts the receiving surface 132 of the shuttle. Continued downward movement of the shelves 100 moves the support arms 116 through the support arm indentations 136 on the labware receiving surface 132 such that the labware is completely supported by the shuttle 128. After the support arms 116 that previously held the labware move beneath the shuttle receiving surface, the support arms diverge as one support arm wraps around the first bottom sprocket 103 of the elevator system and the opposite corresponding support arm wraps around the second bottom sprocket 104. By wrapping around the bottom sprockets 103–104, the support arms move outside of the two side beams and the shelf previously formed by the two support arms is temporarily removed. When the elevator has moved the support arms 116 one shelf level, the index arm sensor 76 signals the controller and the elevator motor 94 is stopped. Next, the controller 201 polls the labware sensor 74 to make sure that the labware has been successfully transferred to the transporter 18. If the labware 2 has not been transferred, an error message will be posted on the display 203.

After labware 2 is successfully placed upon the shuttle 128, the labware may be transported to the second position by movement of the shuttle along the track 126. The shuttle rails 134 hold the labware in position as the shuttle 128 is moved along the track 126. Upon reaching the second position, the second position sensor 139 will instruct the controller 201 to stop the transporter motor 123. In a preferred embodiment the labware receiving surface 132 may be rotated with respect to the track 126 and base 12 of the automated labware storage apparatus. Rotation of the receiving surface 132 provides for multiple angular presentations of the labware 2 in the second position. Various tests or other laboratory procedures may be performed upon the contents of the labware from the second position. For example, a robotic arm may be used to remove the labware from the shuttle and transfer the labware to a testing station. Upon completion of testing, the robotic arm may return the labware to the shuttle in the second position.

If the labware 2 is to be transported to a labware hotel different from the hotel which previously dispensed labware, the hotel carousel 26 is rotated to place the desired hotel over the first position. Labware may be returned to the labware hotel by returning the shuttle 128 down the track 126 to the first position. Upon reaching the first position, the first position sensor will instruct the controller 201 to stop the transporter motor 123.

Figure 17:
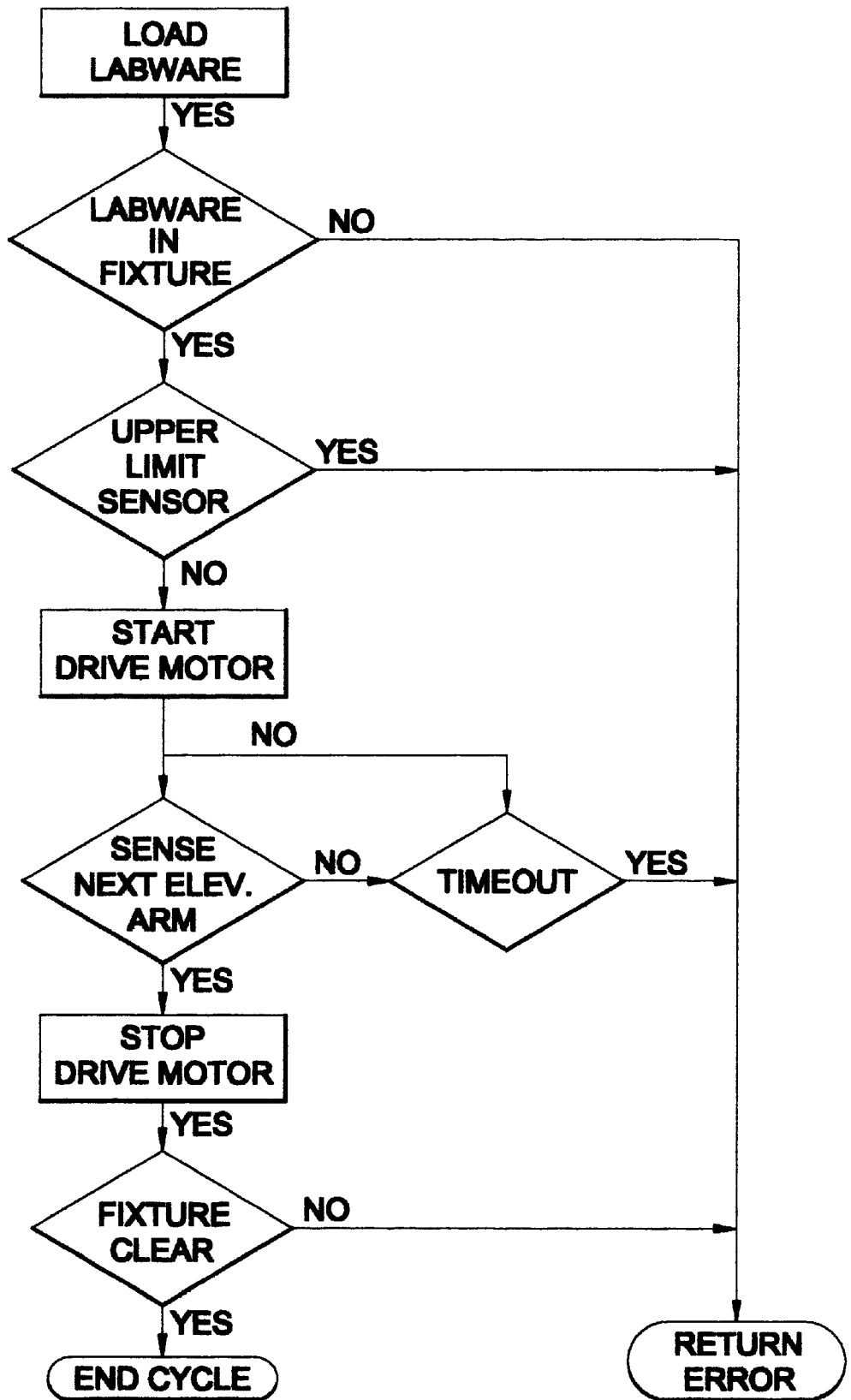
FIG. 17 shows a block diagram of the controller operation for loading labware in the labware hotel of the present invention.

As shown in FIG. 17, before the labware is loaded into the hotel located above the first position, the controller 201 polls the labware sensor 74 for the presence of labware on the shuttle. If labware 2 is not sensed on the shuttle 128, an error message is displayed. Additionally, the controller 201 polls the upper limit sensor 80 to determine if the hotel 16 is full. If there is no room for additional labware in the hotel, an error message will be displayed. With labware present in the shuttle 128 and room for labware in the hotel, the support surfaces cooperate with the transporter to remove labware from the transporter and relocate the labware in the labware hotel. To accomplish this task, the controller 201 operates the elevator motor 94 to move the elevator shelves 100 upward. As the elevator shelves 100 move upward, the support arms 116 wrap around the bottom sprockets 103–104 and move from below the receiving surface 132 through the support arm indentations 136 of the transporter to contact the bottom of the labware 2 situated in the shuttle. Continued upward movement of the elevator shelves 100 pulls the labware from the shuttle so that it is supported by the elevator arms 100 and places the labware 2 on the bottom shelf of the hotel. The arm index sensor 76 signals the controller 201 when the elevator has moved the support arms one level. This causes the controller to stop the elevator motor 94. Next, the controller 201 polls the labware sensor 74 to make sure that the labware has been successfully removed from the transporter 18. If the labware has not been removed, an error message will be posted on the display or automated controller such as a personal computer.

The above described embodiment of the present invention is given by way of example only. Other implementations may be devised by those of ordinary skill in the art that incorporate the principles of the present invention and fall within the scope thereof. For example, in an alternative embodiment, the present invention could include multiple shuttles positioned under multiple labware hotels for receiving labware from the hotels or distributing labware to the hotels, wherein the multiple shuttles are moveable between at least two positions. Furthermore, the present invention could include a line of labware hotels rather than a carousel of labware hotels, and the labware hotels could be moved along a linear track to position one of the hotels above the first position of the transporter. An additional embodiment of the present invention could include labware hotels suspended from hotel supports rather than resting upon hotel supports. A further embodiment of the invention could provide support surfaces that each comprise a single shelf mounted to a single elevator system. Modification of the support surfaces may require modification of the transporter and particularly the support arm indentations. For example, receiving surface 132 could be configured so that it supports labware only at opposite ends, in essence, by eliminating the portion of receiving surface 132 between support arms indentations 136. In this embodiment, the receiving surface may need to be raised so it is sufficiently higher than the shuttle runner to provide sufficient clearance for the support surface to rotate beneath the receiving surface and above the shuttle runner. In another alternative embodiment, the support arms may be integral with the elevator cable rather than clamped on to the cable. The support arms could be made integral with the cable by welding the support arms onto the elevator cable or molding the cable to include support arms. In still another embodiment, each hotel may be stationary, and the transporter may be operable to move a labware receiving surface to any hotel. For example, all of the hotels may be arrayed in an arc or semicircle, and one end of the transporter may be in the center of the hotels. This end of the transporter may pivot so that the opposite end of the transporter may be positioned beneath any selected hotel. Alternatively, all the hotels may be positioned in a line and be stationary. In this embodiment, the transporter may be configured so its straight track is long enough to extend under each hotel as well as to a staging area.

What is claimed is:

1. An apparatus for storing and retrieving a plurality of microplates, the apparatus comprising:
   a. at least one microplate hotel, each microplate hotel comprising:
      i. a frame,
      ii. an elevator cable,
      iii. a plurality of support surfaces, each support surface for receiving and supporting a microplate, the support surfaces being removably positioned upon the elevator cable such that the distance between adjacent support surfaces on the elevator cable may be varied,
      iv an elevator motor capable of moving the elevator cable and support surfaces in unison; and
   b. a microplate transporter capable of holding one of the plurality of microplates, the transporter being movable between a first position and a second position such that when the transporter is in the first position one of the plurality of support surfaces may engage the one of the plurality of microplates held on the transporter.

2. The apparatus of claim 1 further comprising at least one hotel support, the at least one microplate hotel removably held by the at least one hotel support.

3. The apparatus of claim 2 wherein the at least one hotel support further comprises a first electrical connector and the at least one microplate hotel further comprises a second electrical connector such that the first electrical connector engages the second electrical connector of the at least one microplate hotel held on the at least one hotel support.

4. The apparatus of claim 1 further comprising a control system operable to control movement of the elevator cable and microplate transporter.

5. The apparatus of claim 4 wherein the at least one microplate hotel further comprises means for determining the position of the support surfaces, the means for determining the position of the support surfaces operable to communicate with the control system.

6. The apparatus of claim 5 wherein the means for determining the position of the support surfaces is an optical sensor.

7. The apparatus of claim 5 wherein the means for determining the position of the support surfaces is electrically retrievable information stored within the at least one microplate hotel.

8. The apparatus of claim 1 wherein the support surfaces include clamps operable to be tightened against the elevator cable and loosened from the elevator cable to facilitate varying the distance between adjacent support surfaces on the elevator cable.

9. The apparatus of claim 1 wherein movement of the elevator cable is operable to move one of the plurality of microplates between at least one of the plurality of support surfaces and the microplate transporter located in the first position.

10. The apparatus of claim 1 wherein the microplate transporter is rotatable.

11. The apparatus of claim 1 wherein the microplate transporter exposes a portion of a bottom surface of one of the plurality of microplates held by the transporter.

12. The apparatus of claim 1 wherein each support surface comprises a plurality of support arms.

13. An automated device for storing labware comprising:
   a. a plurality of labware hotels, each labware hotel comprising:
      i. a frame,
      ii. a plurality of labware support surfaces,
      iii. an elevator operable to move the plurality of labware support surfaces with respect to the frame in unison, and
      iv. a first electrical connector;
   b. at least one hotel support comprising a second electrical connector engagable with the first electrical connector of one of the plurality of labware hotels when the hotel is mounted in the hotel support.

14. The automated device of claim 13 wherein each of the plurality of labware hotels further comprises an elevator drive such that engagement of the first electrical connector and the second electrical connector provides power to the elevator drive.

15. The automated device of claim 13 further comprising
   a. a control system operable to receive registration information from each of the plurality of labware hotels; and wherein
   b. each of the plurality of labware hotels further comprises electrically retrievable information concerning the hotel or items stored therein, the information being communicable to the control system via the second electrical connector of the at least one hotel support.

16. The automated device of claim 15 further comprising:
   a. a transporter capable of holding labware, wherein
   b. the support surfaces cooperate with the transporter to place labware upon the transporter or remove labware from the transporter; and
   c. the control system sends instructions to the elevator to place labware on, and remove labware from, the transporter.

17. An automated device for storing labware comprising:
   a. at least one labware hotel comprising:
      i. a plurality of labware support surfaces, and
      ii. means for moving a labware from a support surface to a labware transporter; and
   b. a labware transporter capable of receiving labware from the labware hotel and transporting the labware between a first position in which the labware may be either placed into or removed from the labware hotel and a second position distant from the first position, the transporter comprising:
      i. a track,
      ii. a shuttle comprising a labware receiving surface, the shuttle being movable on the track between the first and second positions,
      iii. the labware receiving surface being rotatable with respect to the track such that labware on the labware receiving surface may be rotated between at least two angular orientations.

18. The device of claim 17 wherein each labware hotel further comprises an elevator operable to move the support surfaces in unison.

19. The device of claim 17 wherein the shuttle comprises a base and the labware receiving surface is rotatable with respect to the base.

20. A system for storing and retrieving a plurality of labware, the apparatus comprising:
   a. a plurality of labware hotels comprising first electrical connectors and storage areas for storing multiple labware;
   b. a mounting system to which the plurality of labware hotels may be removably mounted, the mounting system including a plurality of hotel supports having associated second electrical connectors engageable with the first electrical connectors, the mounting system being operable to move the plurality of labware hotels in unison so that one of the plurality of labware hotels may be moved to a first position; and
   c. a labware transporter capable of receiving labware from the one of the plurality of labware hotels in the first position and transporting the labware between the first position in which the labware may be either placed into or removed from the labware hotel and a second position distal from the first position.

21. The system of claim 20 wherein the mounting system comprises a carousel.

22. The system of claim 20 wherein each labware hotel storage area further comprises:
   i. a plurality of support surfaces, each support surface for receiving and supporting labware,
   ii. an elevator capable of moving the support surfaces in unison.

23. The system of claim 22 wherein the distance between each support surface is adjustable.

24. The system of claim 20 wherein the labware transporter is rotatable.

25. The system of claim 20 wherein each labware hotel further comprises an elevator drive such that engagement of one of the first electrical connectors and one of the second electrical connectors provides power to the elevator drive.

26. The system of claim 20 wherein one of the plurality of labware hotels further comprises electrically retrievable registration information concerning the labware hotel, the information being communicable via the first electrical connector of the labware hotel, the system further comprising:
   a control system operable to receive registration information from the labware hotel when one of the plurality of second electrical connectors is engaged with the first electrical connector of the labware hotel.

* * * * *